(12) United States Patent
Obayashi et al.

(10) Patent No.: US 9,000,606 B2
(45) Date of Patent: Apr. 7, 2015

(54) POWER SUPPLY APPARATUS FOR VEHICLE

(75) Inventors: Kazuyoshi Obayashi, Chita-gun (JP);
Akira Sakamoto, Obu (JP); Atsuyuki Hiruma, Kariya (JP); Masahito Mizukoshi, Nagoya (JP); Jun Ishii, Okazaki (JP); Mitsuru Fujita, Kuwana (JP)

(73) Assignee: Denso Corporation, Kariya (JP)

( * ) Notice: Subject to any disclaimer, the term of this patent is extended or adjusted under 35 U.S.C. 154(b) by 759 days.

(21) Appl. No.: 13/093,278

(22) Filed: Apr. 25, 2011

(65) Prior Publication Data

US 2011/0260528 A1 Oct. 27, 2011

(30) Foreign Application Priority Data

Apr. 27, 2010 (JP) ................................. 2010-101696

(51) Int. Cl.
*B60L 1/00* (2006.01)
*B60L 11/18* (2006.01)
(Continued)

(52) U.S. Cl.
CPC ............ *B60L 11/1816* (2013.01); *B60L 1/003* (2013.01); *B60L 3/00* (2013.01); *B60L 11/14* (2013.01); *B60L 2210/10* (2013.01); *B60L 2210/40* (2013.01); *B60L 2240/80* (2013.01); *B60L 2250/10* (2013.01); *Y02T 10/7005* (2013.01);
(Continued)

(58) Field of Classification Search
CPC ............................. B60R 16/03; Y02T 10/7005
USPC ........ 307/9.1, 10.1; 318/12, 400.09; 320/137; 180/65.21
See application file for complete search history.

(56) References Cited

U.S. PATENT DOCUMENTS 3,324,376 A * 6/1967 Hunt ............................... 363/42
5,099,186 A * 3/1992 Rippel et al. ................... 318/803
(Continued)

FOREIGN PATENT DOCUMENTS

JP B2 3477850 12/2003
JP A-2007-195336 8/2007
(Continued)

OTHER PUBLICATIONS

Apr. 17, 2012 Notification of Reasons for Rejection issued in Japanese Patent Application No. 2010-101696 (with translation).

*Primary Examiner* — Carlos Amaya
*Assistant Examiner* — Alfonso Perez Borroto
(74) *Attorney, Agent, or Firm* — Oliff PLC (57) ABSTRACT

A power supply apparatus for a vehicle supplies/charges electric power to/from a power supply unit. The vehicle includes a first power-inverter circuit, a capacitor, high-resistance and low-resistance electric-paths between the capacitor and a battery, a first switching unit opening/closing the electric-paths, and a unit operating the first switching unit, when connecting between the battery and the first power-inverter circuit, in such a manner that after the high-resistance electric path is closed and the low-resistance electric path is opened, the high-resistance electric-path is opened and the low-resistance electric-path is closed. The apparatus includes an electric power transferring electric-path, an operating unit operating the first power-inverter circuit to supply/receive electric power to/from the power supply unit, and a prohibiting unit prohibiting the electric-path between the power supply unit and the first power-inverter circuit from closing when the amount of charge of the capacitor is equal to or less than a predetermined value.

6 Claims, 4 Drawing Sheets

(51) Int. Cl.
*B60L 3/00* (2006.01)
*B60L 11/14* (2006.01)

(52) U.S. Cl.
CPC ............ *Y02T 10/7088* (2013.01); *Y02T 90/121* (2013.01); *Y02T 90/127* (2013.01); *Y02T 90/14* (2013.01); *Y02T 10/7077* (2013.01); *Y02T 10/7241* (2013.01); *Y02T 10/7216* (2013.01)

(56) References Cited

U.S. PATENT DOCUMENTS

| | | | | |
|---|---|---|---|---|
| 5,373,195 | A * | 12/1994 | De Doncker et al. | 307/45 |
| 6,431,297 | B1 * | 8/2002 | Nakazawa | 180/65.6 |
| 6,930,460 | B2 * | 8/2005 | Ishikawa et al. | 318/442 |
| 7,265,455 | B2 * | 9/2007 | Oyobe et al. | 290/1 R |
| 7,495,399 | B2 * | 2/2009 | Oyobe et al. | 318/143 |
| 7,561,389 | B2 * | 7/2009 | Ishikawa et al. | 361/42 |
| 7,649,335 | B2 * | 1/2010 | Ishikawa et al. | 320/104 |
| 7,688,604 | B2 * | 3/2010 | Oyobe et al. | 363/40 |
| 7,714,543 | B2 * | 5/2010 | Yoshida | 320/134 |
| 7,764,051 | B2 * | 7/2010 | Ishikawa et al. | 322/29 |
| 7,819,213 | B2 * | 10/2010 | Oyobe et al. | 180/65.27 |
| 7,832,507 | B2 * | 11/2010 | Nakamura et al. | 180/2.1 |
| 7,859,201 | B2 * | 12/2010 | Oyobe et al. | 318/105 |
| 7,891,451 | B2 * | 2/2011 | Oyobe et al. | 180/65.275 |
| 8,002,056 | B2 * | 8/2011 | Chakrabarti et al. | 180/65.22 |
| 8,054,013 | B2 * | 11/2011 | Oyobe et al. | 318/139 |
| 8,054,025 | B2 * | 11/2011 | Oyobe et al. | 318/441 |
| 8,084,882 | B2 * | 12/2011 | Soma et al. | 307/9.1 |
| 8,086,363 | B2 * | 12/2011 | Uchida | 701/22 |
| 8,091,665 | B2 * | 1/2012 | Kuno | 180/65.285 |
| 8,115,334 | B2 * | 2/2012 | Vyas et al. | 307/10.1 |
| 8,143,861 | B2 * | 3/2012 | Oyobe et al. | 320/138 |
| 8,201,650 | B2 * | 6/2012 | Yoshida | 180/65.22 |
| 8,643,235 | B2 * | 2/2014 | Omiya et al. | 310/64 |
| 2003/0146726 | A1 * | 8/2003 | Ishikawa et al. | 318/442 |
| 2005/0109550 | A1 * | 5/2005 | Buglione et al. | 180/65.2 |
| 2007/0103002 | A1 * | 5/2007 | Chiao et al. | 307/10.1 |
| 2008/0197810 | A1 * | 8/2008 | Ishikawa et al. | 320/135 |
| 2009/0067205 | A1 * | 3/2009 | Oyobe et al. | 363/98 |
| 2009/0121659 | A1 * | 5/2009 | Oyobe et al. | 318/12 |
| 2009/0156068 | A1 * | 6/2009 | Barrett et al. | 440/3 |
| 2009/0159348 | A1 * | 6/2009 | Oyobe et al. | 180/65.21 |
| 2009/0167079 | A1 * | 7/2009 | Nozawa et al. | 307/10.1 |
| 2009/0195067 | A1 * | 8/2009 | Ichikawa et al. | 307/9.1 |
| 2009/0195197 | A1 * | 8/2009 | Nishimura et al. | 318/400.09 |
| 2009/0230901 | A1 * | 9/2009 | Amano | 318/400.3 |
| 2009/0301801 | A1 * | 12/2009 | Fujitake | 180/65.29 |
| 2009/0306841 | A1 * | 12/2009 | Miwa et al. | 701/22 |
| 2009/0315518 | A1 * | 12/2009 | Soma et al. | 320/134 |
| 2010/0025127 | A1 * | 2/2010 | Oyobe | 180/65.22 |
| 2010/0027170 | A1 * | 2/2010 | Kishimoto | 361/31 |
| 2010/0027305 | A1 * | 2/2010 | Oyobe et al. | 363/131 |
| 2010/0063660 | A1 * | 3/2010 | Uchida | 701/22 |
| 2010/0065351 | A1 * | 3/2010 | Ichikawa | 180/65.8 |
| 2010/0072865 | A1 * | 3/2010 | Endo et al. | 310/68 D |
| 2010/0244599 | A1 * | 9/2010 | Saban et al. | 310/71 |
| 2011/0260528 | A1 * | 10/2011 | Obayashi et al. | 307/9.1 |

FOREIGN PATENT DOCUMENTS

| | | |
|---|---|---|
| JP | A 2007-318970 | 12/2007 |
| JP | A-2009-065808 | 3/2009 |
| WO | WO 2008081703 A1 * | 7/2008 |

* cited by examiner

POWER SUPPLY APPARATUS FOR VEHICLE

CROSS-REFERENCE TO RELATED APPLICATION

This application is based on and claims the benefit of priority from earlier Japanese Patent Application No. 2010-101696 filed Apr. 27, 2010, the description of which is incorporated herein by reference.

BACKGROUND

1. Technical Field

The present invention relates to a power supply apparatus for a vehicle which supplies electric power to a power supply unit and charges electric power from the power supply unit to a battery of the vehicle via a power port.

2. Related Art

This type of power supply apparatus is disclosed in JP-A-2007-318970. This power supply apparatus uses an inverter which is operated to control power applied to drive wheels of a vehicle by a motor generator, thereby storing electric power supplied from an external commercial power source in a battery of the vehicle.

Generally, a capacitor is connected to input terminals of the inverter. Charge stored in the capacitor is discharged by stopping the inverter. In this state, when the commercial power source and the inverter are electrically connected to each other to supply the electric power from the commercial power source to the inverter, a rush current passes into the capacitor, which can decrease the reliability of the electric system connecting between the external commercial power source and the capacitor.

SUMMARY

As an aspect of the embodiment, a power supply apparatus for a vehicle is provided which supplies electric power to a power supply unit and charges electric power from the power supply unit to a battery of the vehicle via a power port, wherein the vehicle includes a first power inverter circuit which supplies electric power to a load and receives electric power from the load, a capacitor which is connected to the first power inverter circuit, a high-resistance electric path and a low-resistance electric path which electrically connect between the capacitor and the battery and whose resistance values are different from each other, a first switching unit which opens/closes the high-resistance electric path and the low-resistance electric path, and a unit which operates the first switching unit, when connecting between the battery and the first power inverter circuit, in such a manner that after a first state is maintained in which the high-resistance electric path is closed and the low-resistance electric path is opened, a second state is maintained in which the high-resistance electric path is opened and the low-resistance electric path is closed, includes: an electric power transferring electric path which connects the power port to the first power inverter circuit; an operating unit which operates the first power inverter circuit to supply electric power to the power supply unit and receive electric power from the power supply unit; and a prohibiting unit which prohibits the electric path between the power supply unit and the first power inverter circuit from closing when the amount of charge of the capacitor is equal to or less than a predetermined value.

BRIEF DESCRIPTION OF THE DRAWINGS

In the accompanying drawings.

DETAILED DESCRIPTION OF THE PREFERRED EMBODIMENTS

With reference to the accompanying drawings, hereinafter is described an embodiment of a power supply apparatus which is applied to a parallel hybrid vehicle.

Figure 1:
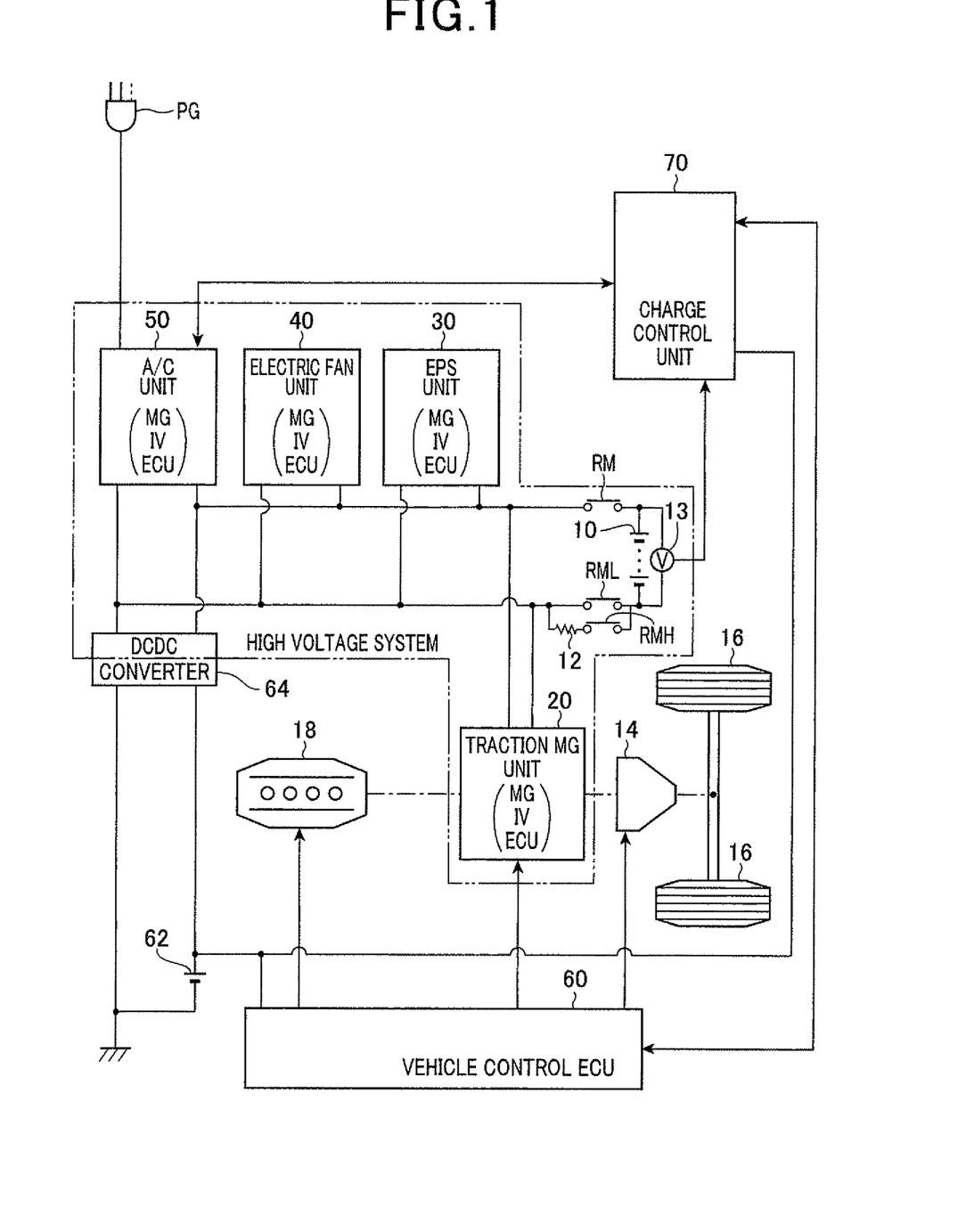
FIG. 1 is a diagram showing a system configuration according to an embodiment.

FIG. 1 is a diagram showing a system configuration including the power supply apparatus of the embodiment. A high-voltage battery 10 configures an in-vehicle high voltage system. The terminal voltage of the high-voltage battery 10 becomes high (e.g. one hundred volts or more). The high-voltage battery 10 is connected with a traction MG (Motor/Generator) unit 20, an electric power steering unit 30, an electric fan unit 40, and an air conditioning unit 50, which are loads. Specifically, the loads are connected to one terminal of the high-voltage battery 10 (e.g. positive electrode) via a relay RM. The loads are also connected to the other terminal of the high-voltage battery 10 (e.g. negative electrode) via a parallel connection unit in which a high-resistance side relay RMH and a resistor 12 are connected with a low-resistance side relay RML in parallel.

The traction MG unit 20 is a control system which includes a motor generator (MG) which is an in-vehicle main engine, an inverter (IV), and an electronic control unit (ECU), and controls controlled variables of the motor generator. One end of a rotating shaft of the motor generator is directly connected with an output shaft (crankshaft) of an internal combustion engine 18. The other end of the rotating shaft is mechanically coupled to drive wheels 16 via a transmission 14.

Similarly, the electric power steering unit 30 is a control system which includes a motor generator (MG) which assists the user in displacing the steering angle, an inverter (IV), and an electronic control unit (ECU). The electric power steering unit 30 controls controlled variables of the motor generator. The electric fan unit 40 is a control system which includes a motor generator (MG) which rotates a fan for cooling coolant of the internal combustion engine 18, an inverter (IV), and an electronic control unit (ECU). The electric fan unit 40 controls controlled variables of the motor generator. The air conditioning unit 50 is a control system which includes a motor generator (MG) which applies rotational energy to a compressor, an inverter (IV), and an electronic control unit (ECU). The air conditioning unit 50 controls controlled variables of the motor generator.

A vehicle control ECU 60 is an electronic control unit which operates the traction MG unit 20, the internal combustion engine 18, the transmission 14 and the like to control the operation of the vehicle. A charge control unit 70 is an electronic control unit which performs power control in the vehicle such as the control of the amount of charge of the high-voltage battery 10 based on the voltage of the high-voltage battery 10 measured by a voltage sensor 13. The vehicle control ECU 60 and the charge control unit 70 configure an in-vehicle low voltage system which is insulated from the in-vehicle high voltage system. The direct power source of the vehicle control ECU 60 and the charge control unit 70 is a low-voltage battery 62 whose terminal voltage is low (e.g. several volts to a little over ten volts). The output voltage of a DC-DC converter 64, which decreases the voltage of the high-voltage battery 10, is applied to the low-voltage battery 62, whereby the high-voltage battery 10 serves as the power source of the low-voltage battery 62. In FIG. 1, the high voltage system is enclosed within a chain double-dashed line. Note that the ECUs of the traction MG unit 20, the electric power steering unit 30, the electric fan unit 40, and the air conditioning unit 50 are preferably installed in the low voltage system.

The charge control unit 70 has a function for operating the inverter of the air conditioning unit 50 to supply electric power to a power supply unit and receive electric power from the power supply unit. According to the function, for example, control is performed for supplying electric power from a power supply unit in, for example, a house (e.g. electric power of the commercial power source) to the high-voltage battery 10. The power supply unit and the inverter of the air conditioning unit 50 are connected to each other via a plug PG. In the present embodiment, the plug PG is assumed to be an interface which is detachable from both the vehicle and the power supply unit and electrically connects between the inside of the vehicle and the outside of the vehicle. Note that the plug PG may be a part of the vehicle (which is not detachable from the vehicle), or may be a part of the power supply unit (which is not detachable from the power supply unit).

Figure 2:
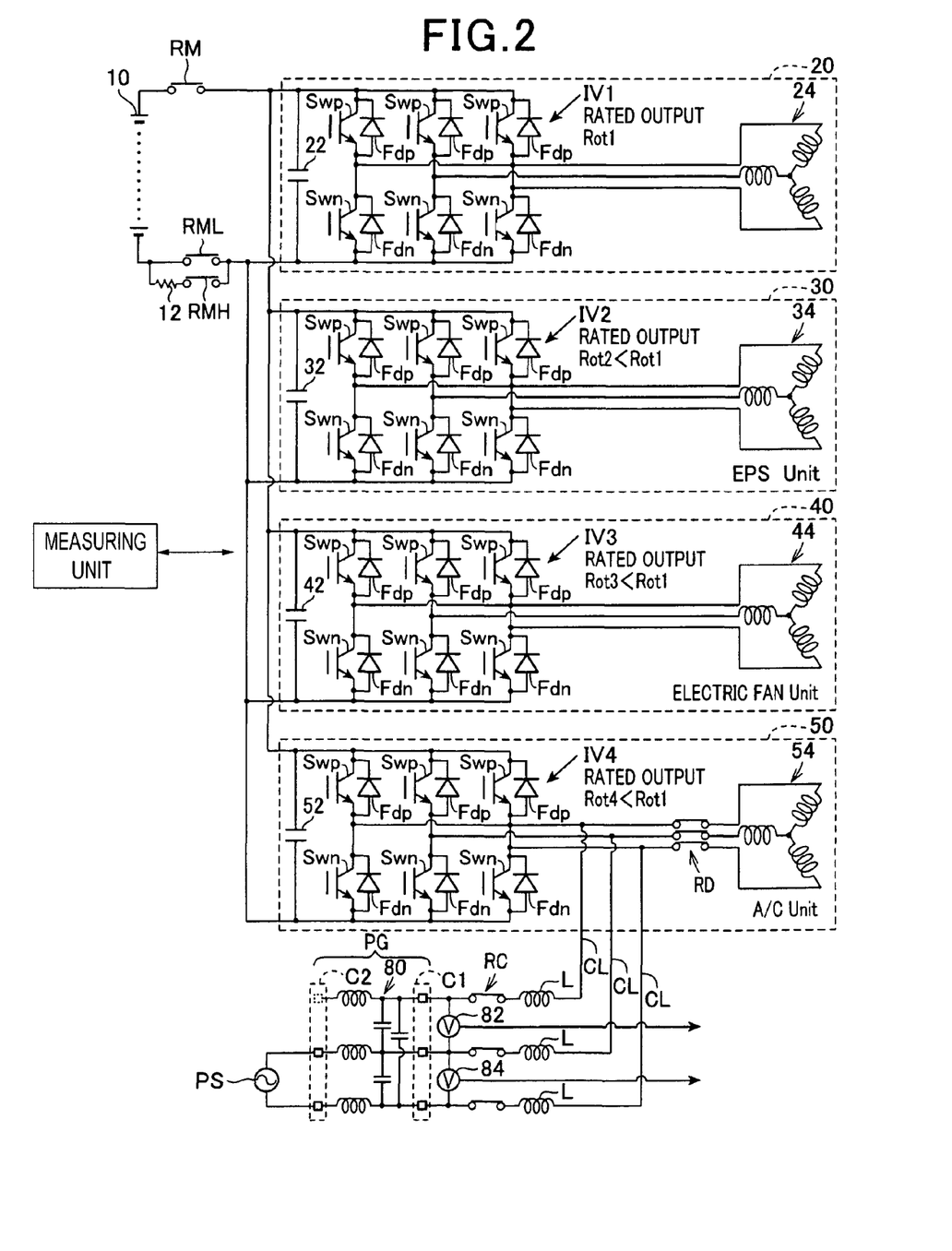
FIG. 2 is a circuit diagram showing a configuration of a power inverter circuit according to the embodiment.

FIG. 2 shows a configuration of a power inverter circuit which includes parts of the traction MG unit 20, the electric power steering unit 30, the electric fan unit 40, and the air conditioning unit 50.

As shown in FIG. 2, each of a traction MG inverter IV1 of the traction MG unit 20, a power steering inverter IV2 of the electric power steering unit 30, a fan inverter IV3 of the electric fan unit 40, and an air conditioning inverter IV4 of the air conditioning unit 50 has three pairs of serial connection units in which a high-electric-potential side switching element Swp and a low-electric-potential side switching element Swn are connected with each other in series. The high-electric-potential side switching element Swp is connected with a free wheel diode Fdp in antiparallel. The low-electric-potential side switching element Swn is connected with a free wheel diode Fdn in antiparallel. In FIG. 2, insulated gate bipolar transistors (IGBT) are shown as examples of the switching elements Swp and Swn.

The traction MG inverter IV1 has input terminals which are connected to a capacitor 22, and output terminals which are connected to a traction motor generator 24. The power steering inverter IV2 has input terminals which are connected to a capacitor 32, and output terminals which are connected to a power steering motor generator 34. The fan inverter IV3 has input terminals which are connected to a capacitor 42, and output terminals which are connected to a fan motor generator 44. The air conditioning inverter IV4 has input terminals which are connected to a capacitor 52, and output terminals which are connected to an air conditioning motor generator 54.

The rated output Rot1 of the traction MG inverter IV1 is set so as to be larger than each of the rated output Rot2 of the power steering inverter IV2, the rated output Rot3 of the fan inverter IV3, and the rated output Rot4 of the air conditioning inverter IV4.

The output terminals of the air conditioning inverter IV4 are connected to a power port (connector C1), which is electrically connected to the outside of the vehicle, via electric power transferring electric paths CL. The connector C1 can be connected to one end of the plug PG. The other end of the plug PG is connected to a power port (connector C2) which connects a power source PS such as the commercial power source in a house, which serves as a power supply unit, to the outside of the house. The plug PG includes a filter 80. In the embodiment, an LC circuit is illustrated as the filter 80. In FIG. 2, a single-phase power source is illustrated as the power source PS. However, since the vehicle of the embodiment is assumed to be adaptable to a three-phase power source, the connector C1 includes three terminals.

Auxiliary unit Relays RD are respectively disposed between the air conditioning motor generator 54 and the connecting points between the output terminals of the air conditioning inverter IV4 and the electric power transferring electric paths CL. The auxiliary unit relays RD electrically open/close the paths between the motor generator 54 and the connecting points. The electric power transferring electric paths CL are respectively provided with power transferring relays RC, which open/close the electric paths CL, and charging reactors L which store energy. The auxiliary relays RD prevent electric power from being supplied to the air conditioning motor generator 54 when electric power is transferred between the power supply unit and the vehicle.

Voltage sensors 82 and 84 are respectively provided between one of the three terminals of the connector C1 and the other two of the three terminals, and measure the potential difference therebetween. The charge control unit 70 performs control for supplying electric power supplied from the power source PS to the high-voltage battery 10 based on outputs of the voltage sensors 82 and 84 or the like.

In the present embodiment, the high-voltage battery 10 is charged by using the air conditioning inverter IV4 connected to the air conditioning motor generator 54, which is an in-vehicle electric load other than the traction motor generator 24 which applies power to the drive wheels 16. Hence, even when the total time period during which charging is performed is increased, the efficiency of the traction MG inverter IV1 does not deteriorate. In addition, the charging can be performed with high efficiency. That is, available electric power of the commercial power source is generally around 1.5 to 3 kW, which is smaller than the maximum output of the traction MG inverter IV1 (e.g. 15 kW or more). Meanwhile, the ratio (efficiency) of output power of an inverter to input power of the inverter is generally maximized in the vicinity of the maximum output and becomes small in the vicinity of the minimum output. Hence, if charging is performed by using the traction MG inverter IV1, the efficiency can greatly decrease. Conversely, since the maximum output of the air conditioning inverter IV4 is "several kilowatt (kW)", charging can be performed with high efficiency.

FIGS. 3A to 3D show aspects of charging control according to the embodiment. FIGS. 3A to 3D illustrate cases where electric power is supplied from a single-phase power source.

Figure 3A:
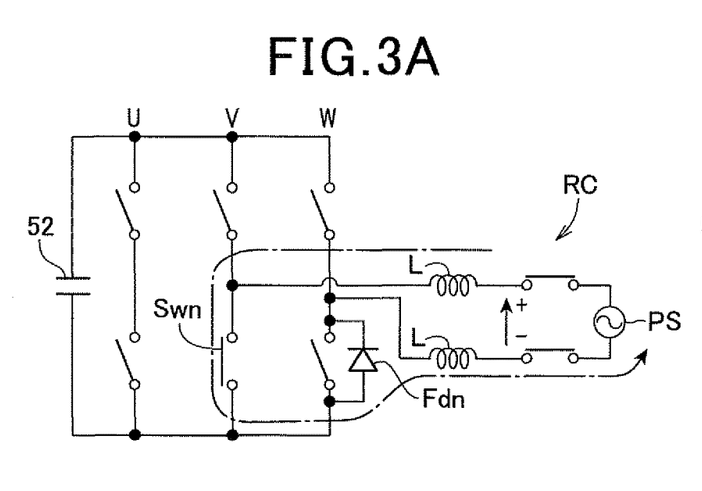
FIGS. 3A to 3D are circuit diagrams showing charging processes according to the embodiment.
Figure 3B:
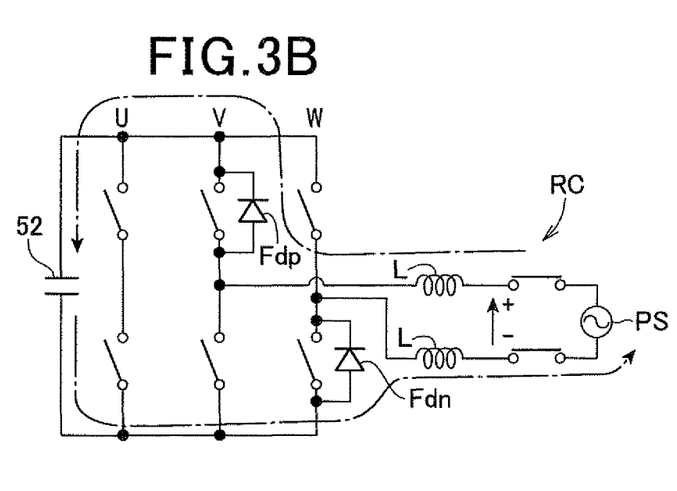

FIGS. 3A and 3B illustrate a case where the electric potential of the V-phase is higher than that of the W-phase. As shown in FIG. 3A, when the low-electric-potential side switching element Swn of the V-phase is turned on, a current passes through a loop circuit including the power source PS, the charging reactor L, the switching element Swn of the V-phase, the free wheel diode Fdn of the W-phase, and the charging reactor L, whereby energy is stored in the charging reactors L. Thereafter, as shown in FIG. 3B, when the switching element Swn of the V-phase is turned off, a current passes through a loop circuit including the power source PS, the charging reactor L, the free wheel diode Fdp of the V-phase, the capacitor 52, the free wheel diode Fdn of the W-phase, and the charging reactor L, whereby the capacitor 52 is charged, and the high-voltage battery 10 connected to the capacitor 52 in parallel is also charged.

Figure 3C:
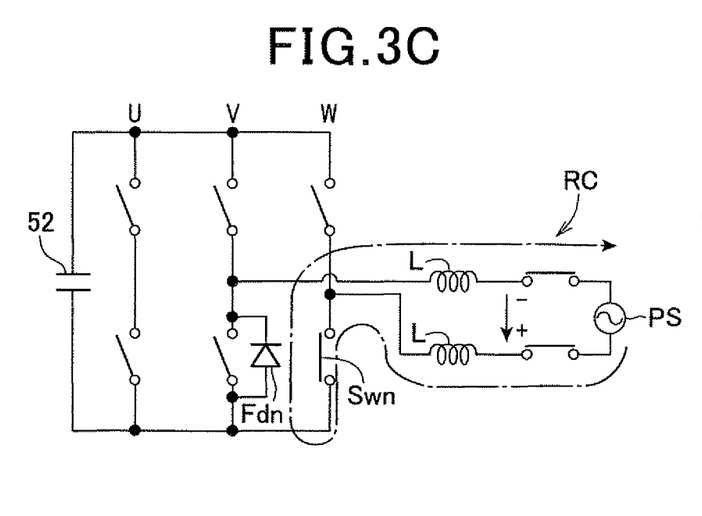
Figure 3D:
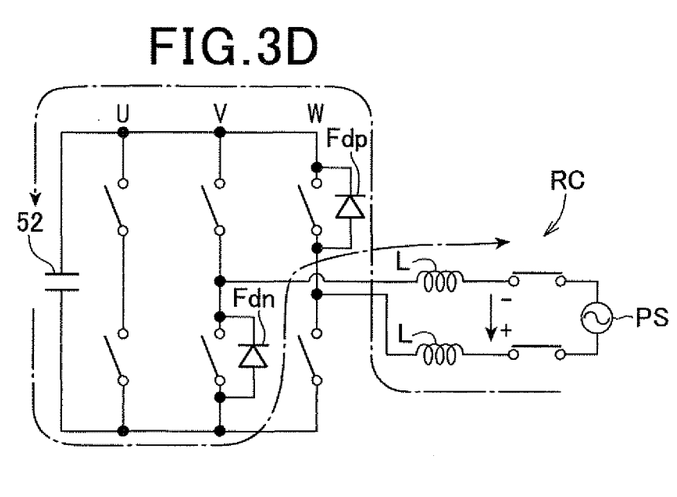

FIGS. 3C and 3D illustrate a case where the electric potential of the W-phase is higher than that of the V-phase. As shown in FIG. 3C, when the low-electric-potential side switching element Swn of the W-phase is turned on, a current passes through a loop circuit including the power source PS, the charging reactor L, the switching element Swn of the W-phase, the free wheel diode Fdn of the V-phase, and the charging reactor L, whereby energy is stored in the charging reactors L. Thereafter, as shown in FIG. 3D, when the switching element Swn of the W-phase is turned off, a current passes through a loop circuit including the power source PS, the charging reactor L, the free wheel diode Fdp of the W-phase, the capacitor 52, the free wheel diode Fdn of the V-phase, and the charging reactor L, whereby the capacitor 52 is charged, and the high-voltage battery 10 connected to the capacitor 52 in parallel is also charged.

The capacitors 22, 32, 42, and 52 are respectively connected to the input terminals of the traction MG inverter IV1, the power steering inverter IV2, the fan inverter IV3, and the air conditioning inverter IV4. When the traction MG inverter IV1, the power steering inverter IV2, the fan inverter IV3, and the air conditioning inverter IV4 are stopped, the capacitors 22, 32, 42, and 52 are discharged by a well-known method (discharging by a discharging resistor (not shown) or ineffective energization to the motor generator). If a power supply unit and the air conditioning inverter IV4 are electrically connected to each other in a state where the capacitors 22, 32, 42, and 52 have been discharged, a rush current can pass from the power supply unit to the capacitors 22, 32, 42, and 52. The rush current can decrease the reliability of the capacitors 22, 32, 42, and 52, the free wheel diode Fdn, and the like.

To solve the above problems, according to the embodiment, when the voltages of the capacitors 22, 32, 42, and 52 do not reach the lower voltage at which a rush current, which can decrease the reliability, does not pass, the power transferring relays RC are prohibited from closing. The capacitors 22, 32, 42, and 52 are charged by using a path including the high-resistance side relay RMH and the resistor 12. That is, although the high-resistance side relay RMH and the resistor 12 are generally used to charge the capacitors 22, 32, 42, and 52 by using the traction MG inverter IV1, the power steering inverter IV2, the fan inverter IV3, and the air conditioning inverter IV4 before in-vehicle loads are driven, the high-resistance side relay RMH and the resistor 12 are also used to charge the capacitors 22, 32, 42, and 52 before electric power is supplied to a power supply unit or received from the power supply unit.

Figure 4:
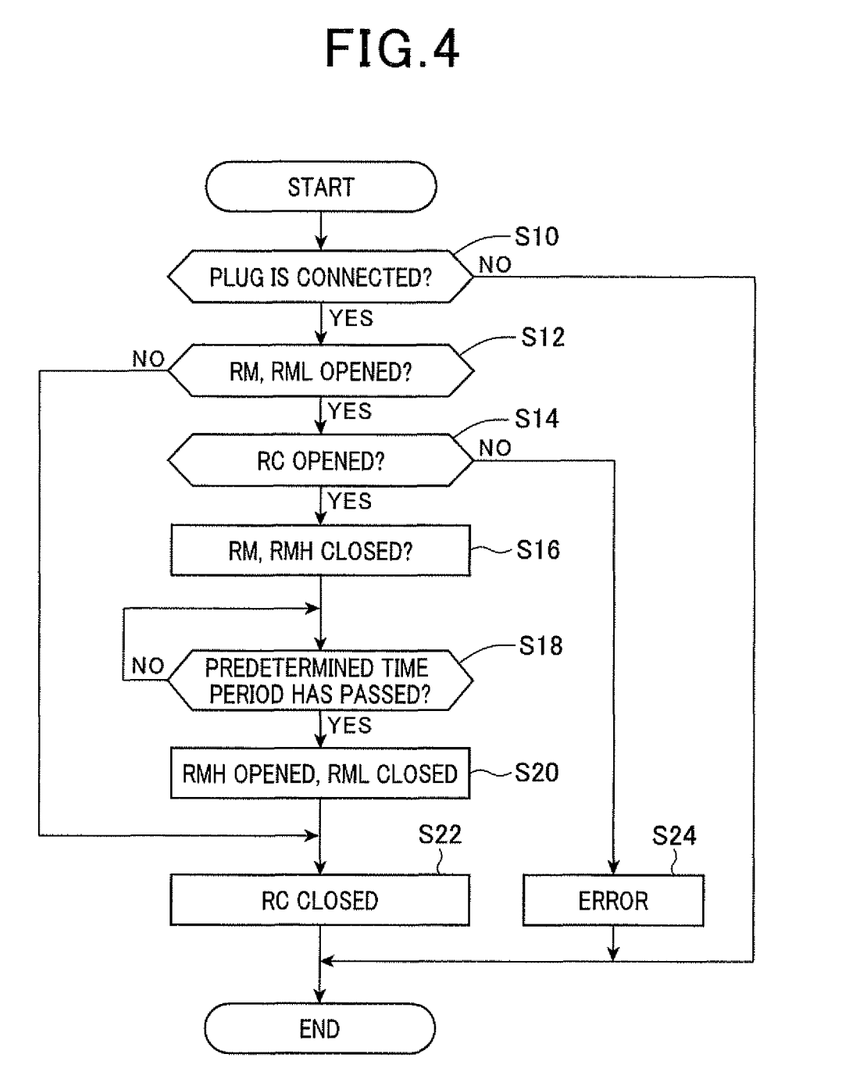
FIG. 4 is a flow chart showing a procedure of a preprocessing for charging according to the embodiment.

FIG. 4 shows a procedure of a process of closing the electric power transferring relays RC according to the present embodiment. This process is repeated, for example, at a predetermined period by the charge control unit 70.

First, in step S10, the charge control unit 70 determines whether or not the plug PG is connected. This determination is performed based on, for example, whether or not voltages are applied to the connector C1 by the voltage sensors 82 and 84. Alternatively, the determination may be performed based on the sensing result by a sensor which senses the material of the plug PG connected to the terminals of the connector C1. When it is determined that the plug PG is connected, in step S12, the charge control unit 70 determines whether or not the relay RM or the low-resistance side relay RML is in an opened state. According to this determination, it is determined whether or not the capacitors 22, 32, 42, and 52 have been charged. That is, when charging the capacitors 22, 32, 42, and 52, the relay RM and the high-resistance side relay RMH are closed. On completing the charging, the high-resistance side relay RMH is opened, and the low-resistance side relay RML is closed. Hence, when the relay RM and the low-resistance side relay RML are in closed states, the capacitors 22, 32, 42, and 52 can be considered to have been charged.

When it is determined that at least one of the relay RM and the low-resistance side relay RML is in the opened state, in step S14, the charge control unit 70 determines whether or not the electric power transferring relays RC are in the opened states. When the relays RC are not in the opened states, in step S24, the charge control unit 70 provides an error notification. That is, the charge control unit 70 notifies that a rush current could have passed through the capacitors 22, 32, 42, and 52 due to the connected plug PG.

When it is determined that the electric power transferring relays RC are in the opened states, in step S16, the charge control unit 70 closes the relay RM and the high-resistance side relay RMH, and waits a predetermined time period (step S18). It is estimated that when the capacitors 22, 32, 42, and 52 are charged by the high-voltage battery 10, the charging voltages of the capacitors 22, 32, 42, and 52 become equal to or more than a predetermined lower voltage during the predetermined time period. When the charging voltages are equal to or more than the predetermined lower voltage, a rush current, which can decrease the above reliability, does not pass. After the predetermined time period has passed, in step S20, the high-resistance side relay RMH is opened, and the low-resistance side relay RML is closed.

When the step S20 is completed, or when, in step S12, it is determined that both the relay RM and the low-resistance side relay RML are closed, in step S22, the electric power transferring relays RC are closed.

When the step S22 and the step S24 are completed, the whole procedure is temporarily ended.

According to the embodiment described above, the following advantages can be obtained.

(1) When the amount of charge of the capacitors 22, 32, 42, and 52 is equal to or less than a predetermined value, the electric path between the power supply unit and the air conditioning inverter IV4 is prohibited from closing. Hence, a rush current can be prevented from passing from the power supply unit to the capacitors 22, 32, 42, and 52, whereby the reliability of the power supply and the electric system between the connector C1 and the capacitors 22, 32, 42, and 52 can be effectively prevented from decreasing.

(2) Before the electric path between the power supply unit and the air conditioning inverter IV4 is closed, electrical energy of the high-voltage battery 10 is supplied to the capacitors 22, 32, 42, and 52 via a high-resistance electric path (resistor 12). Hence, the amount of charge of the capacitors 22, 32, 42, and 52 can be appropriately increased.

(3) After the capacitors 22, 32, 42, and 52 are charged, the electric power transferring relays RC are closed. Hence, when it is assumed that a sufficient rush current would not pass through the capacitors 22, 32, 42, and 52 to decrease the above reliability, the electric path between the power supply unit and the air conditioning inverter IV4 can be safely closed.

(4) The power supply apparatus supplies electric power to a power supply unit or receives electric power from the power supply unit by using the air conditioning inverter IV4. Hence, required durability of the traction MG inverter IV1 can be prevented from becoming excessive due to the transfer of the electric power.

(5) The common high-voltage battery 10 is connected to the air conditioning inverter IV4 and the traction MG inverter IV1. Hence, large discharged electric power and charged electric power can be obtained when supplying electric power to a power supply unit or receiving electric power from the power supply unit.

Other Embodiments

The above embodiment may be modified as described below.

<Concerning the Prohibiting Means>

The prohibiting means prohibits the electric path between the power supply unit and the power inverter circuit (the air conditioning inverter IV4) from closing when the amount of charge of the capacitor 22 is equal to or less than a predetermined value. The prohibiting means may not be structured by the logic which closes the electric power transferring relays RC when charging the capacitor 22 is completed. For example, a dedicated hardware means may be applied which measures the voltage across the capacitor 22 and prohibits operation of the circuit which closes the relays RC when determining that the amount of charge is equal to or less than a predetermined value because the measured voltage is equal to or less than a threshold value.

Alternatively, instead of the means for prohibiting the relays RC form closing, a mechanism may be applied which prohibits the plug PG from being inserted into the connector C1 when the amount of charge of the capacitor 22 is equal to or less than a predetermined value.

Furthermore, instead of the means for prohibiting the electric path between the power supply unit and the power inverter circuit (the air conditioning inverter IV4) from closing, a means can be applied which gives notice to prohibit the plug PG from being connected (inserted) to the connector C1. According to this means, a warning may be given. Alternatively, a means may be applied which gives a warning beep when it is assumed that the plug PG would be inserted into the connector C1.

<Concerning the Preprocessing Means>

The preprocessing means is not limited to the configuration in which the capacitors 22, 32, 42, and 52 are charged by using the high-resistance side relay RMH and the resistor 12 interposed between the high-voltage battery 10 and the capacitors 22, 32, 42, and 52. For example, a dedicated path may be applied between the air conditioning inverter IV4 and the connector C1. The dedicated path is a special high-resistance electric path connected with the electric power transferring electric paths CL in parallel, and charges the capacitors 22, 32, 42, and 52 when electric power is supplied to a power supply unit or receive from the power supply unit.

Note that the transfer of electric power is not limited to supplying the electric power from a power supply unit to the vehicle. The electric power may be supplied from the vehicle to the power supply unit. Even in this case, the preprocessing means is effective when the power supply unit is a residential power source which includes a device enabling interconnected-system operation between the commercial power source and another power source, because a voltage of the commercial power source can be applied to the power port when the power supply unit and the power port are connected with each other.

<Concerning Types of the Inverter for Supplying Electric Power to an External Unit and Receiving Electric Power from the External Unit>

The auxiliary unit inverter for supplying electric power to an external unit (external power supply unit) and receiving electric power from the external unit is not limited to the air conditioning inverter IV4. For example, the fan inverter IV3 or the power steering inverter IV2 may be used. The auxiliary unit inverter is not limited to the above three types. For example, the inverter connected to an in-vehicle rotating machine for displacing the steering angle is not limited to the power steering inverter IV2, and may be an inverter of the rotating machine included in a steering-by-wire system.

Alternatively, instead of the auxiliary unit inverter, the inverter IV1 of the traction MG unit 20 may be applied.

<Concerning the in-Vehicle Power Inverter Circuit>

The in-vehicle power inverter circuit is not limited to the DC-AC converter circuit such as a three-phase inverter connected to a three-phase rotating machine, which converts electric power of a DC power source to AC electric power. For example, a power inverter circuit connected to a brushed DC motor may be applied. This type of power inverter circuit generally has a high-electric-potential side switching element and a low-electric-potential side switching element which respectively connect terminals of the brushed DC motor to a positive electrode of a DC power source and a negative electrode of the DC power source. This type of power inverter circuit generally has one high-electric-potential side switching element and one low-electric-potential side switching element which are respectively connected to the terminals of the brushed DC motor. Hence, when the power inverter circuit inputs three-phase electric power, it is preferable that two or more high-electric-potential side switching elements and low-electric-potential side switching elements are provided which are respectively connected to the terminals of the brushed DC motor.

In addition, the in-vehicle power inverter circuit is not limited to the circuit whose output terminals are connected to a rotating machine. For example, the circuit may be configured with a high-electric-potential side switching element and a low-electric-potential side switching element, which are connected to the high-voltage battery 10 in parallel, and a voltage-decreasing (step-down) converter in which the connecting point between the switching elements is connected to a capacitor via a reactor. In this case, by connecting the electric power transferring electric path CL between the reactor and the capacitor, a specific reactor for charging is not required to be provided.

Furthermore, the power inverter circuit is not limited to the circuit which configures the in-vehicle high voltage system insulated from the in-vehicle low voltage system. For example, a power inverter circuit configuring the in-vehicle low voltage system may be applied. Note that the terminal voltage of the low-voltage battery 62 is considerably lower than that of the commercial power source, in general. Hence, when using a capacitor whose amount of charge corresponds to the terminal voltage of the low-voltage battery 62, a rush current can become large even when preprocessing is performed for previously charging the capacitor. However, for example, when the electric power steering unit 30 is configured in the low voltage system, and a battery is installed which stores sufficient voltage to be applied to the input terminals of the power steering inverter IV2, the above problem can be resolved. This is because the voltage applied across both ends of the power steering inverter IV2 is sufficiently higher than the voltage of the low-voltage battery 62, in general.

Note that the switching elements configuring the power inverter circuit are not limited to IGBTs. For example, field-effect transistors can be used.

<Concerning the Use of the in-Vehicle Power Inverter Circuit>

An auxiliary unit power inverter circuit for supplying electric power to a power supply unit and receiving electric power from the power supply unit is not limited to be used by connecting all the electric power transferring electric paths CL which are connected to one power port (connector C1) to one auxiliary unit power inverter circuit. For example, as illustrated in JP-A-2007-318970, the terminals of the connector C1 may be separately connected to the neutral points of the three-phase rotating machine which are respectively connected to a pair of inverters. In this case, the electric power transferring electric paths include the coils of the three-phase rotating machine.

<Concerning Switches for Transferring Electric Power>

The switches for transferring electric power are not limited to the three electric power transferring relays RC which are respectively provided corresponding to the electric power transferring electric paths CL. For example, in the configuration in which the electric paths CL include only two electric paths assuming that only single-phase electric power is used, one electric power transferring relay RC may be provided which is connected to a path corresponding to one of the two electric paths. Even in this case, by opening the relay RC, an open loop can be established between the electric paths CL and the load such as the air conditioning inverter IV4.

In addition, instead of providing the switches for transferring electric power, a condition for connecting the plug PG may be established. Under the condition, when the vehicle is stopped and required loads are not driven, the logical product is defined as true. This is preferably realized by providing a means which prohibits the other terminal of the plug PG from being inserted into the connector C1 while the logical product is not true.

<Regarding Switches for an Auxiliary Unit>

The switches for an auxiliary unit are not limited to the three auxiliary unit relays RD which are respectively provided corresponding to the electric power transferring electric paths CL. For example, in the configuration in which the electric paths CL include only two electric paths assuming that only single-phase electric power is used, one auxiliary unit relay RD may be provided which opens/closes a path corresponding to one of the two electric paths.

The switches for transferring electric power may not be provided. In this case, instead of the charging reactors L, reactors for an auxiliary unit (e.g. reactors of the air conditioning motor generator 54) may be used to perform charging.

<Other Configurations>

Instead of providing the charging reactors L for all the electric power transferring electric paths CL, for example, one or two of the reactors L may be respectively provided for one or two of the electric paths CL.

Instead of providing one power port (connector C1), a plurality of the power ports may be provided so as to be respectively connected to the auxiliary unit power inverter circuits.

In FIG. 2 and the like, a voltage-increasing (step-up) converter may be interposed between the high-voltage battery 10 and the traction MG inverter IV1.

One or more power inverter circuits may be connected to all the electric power transferring electric paths CL. Hence, since the power inverter circuits can be used in combination, electric energy which is supplied and received via one connector C1 can be increased even when the rated output of one power inverter circuit is small.

The vehicle is not limited to a parallel hybrid vehicle. For example, a series hybrid vehicle, a parallel/series hybrid vehicle and the like may be applied. Alternatively, instead of the hybrid vehicle, for example, an electric vehicle may be applied which includes an electrical rotating machine solely as an in-vehicle main engine.

The control of charging and discharging the high-voltage battery 10 by the vehicle control ECU 60 is not limited to be performed based on the voltage across the high-voltage battery 10. For example, when the high-voltage battery 10 is an assembled battery which is a serial connection of battery cells, the control of charging and discharging the high-voltage battery 10 may be performed based on detection values each of which indicates a state of a predetermined number of the battery cells.

Hereinafter, aspects of the above-described embodiments will be summarized.

As an aspect of the embodiment, a power supply apparatus for a vehicle supplies electric power to a power supply unit and charges electric power from the power supply unit to a main battery of an electric vehicle, a plug-in hybrid vehicle or a vehicle with electrically driven auxiliary units via a power port. The vehicle includes a first power inverter circuit which supplies electric power to a load and receives electric power from the load, a capacitor which is connected to the first power inverter circuit, a high-resistance electric path and a low-resistance electric path which electrically connect between the capacitor and a battery and whose resistance values are different from each other, a first switching unit which opens/closes the high-resistance electric path and the low-resistance electric path, and a unit which operates the first switching unit, when connecting between the battery and the first power inverter circuit, in such a manner that after a first state is maintained in which the high-resistance electric path is closed and the low-resistance electric path is opened, a second state is maintained in which the high-resistance electric path is opened and the low-resistance electric path is closed. The apparatus includes an electric power transferring electric path which connects the power port to the first power inverter circuit; an operating unit which operates the first power inverter circuit to supply electric power to the power supply unit and receive electric power from the power supply unit; and a prohibiting unit which prohibits the electric path between the power supply unit and the first power inverter circuit from closing when the amount of charge of the capacitor is equal to or less than a predetermined value.

When the amount of charge of the capacitor is small, and the electric path between the power supply unit and the in-vehicle power inverter circuit is closed, a rush current can pass from the power supply unit to the capacitor. According to the power supply apparatus, the prohibiting unit can effectively prevent this problem, thereby effectively preventing the reliability of the electric path connecting between the power supply unit and the capacitor from decreasing.

The power supply apparatus further includes a preprocessing unit which supplies electrical energy of the battery to the capacitor via the high-resistance electric path before the electric path between the power supply unit and the first power inverter circuit is closed.

According to the power supply apparatus, the preprocessing unit can increase the amount of charge of the capacitor before the electric path between the power supply unit and the in-vehicle power inverter circuit is closed. In addition, the high-resistance electric path and the switching unit for the capacitor charge the capacitor before being used to supply electric power to an in-vehicle load or receive electric power from the in-vehicle load, which is an original purpose of the power inverter circuit. Hence, by using the high-resistance electric path and the switching unit, the number of components can be decreased.

The power supply apparatus further includes a second switching unit which opens and closes the electric power transferring electric path, wherein the prohibiting unit closes the second switching unit after the electrical energy of the battery is supplied to the capacitor by the preprocessing unit.

According to the power supply apparatus, under the condition in which it is assumed that a rush current would not pass through the capacitor so much so that the above reliability decreases, the electric path between the power supply unit and the in-vehicle power inverter circuit can be closed.

In the power supply apparatus, the vehicle further includes a rotating machine which is mechanically coupled to drive wheels, and a second power inverter circuit which is operated to control power applied to the drive wheels by the rotating machine. The first power inverter circuit is interposed between the battery and an auxiliary unit which is an in-vehicle electric load other than the rotating machine.

According to the power supply apparatus, an auxiliary unit power inverter circuit is used when supplying electric power to the power supply unit or receiving electric power from the power supply unit via the power port. Hence, required durability of the second power inverter circuit can be prevented from becoming excessive due to the transfer of the electric power.

In the power supply apparatus, the battery is connected to input terminals of the second power inverter circuit.

Since the battery connected to the input terminals of the second power inverter circuit directly supplies electric power to the rotating machine or receives electric power from the rotating machine, the capacity of the battery is large. Hence, when transferring electric power between the battery and the power supply unit, large discharged electric power and charged electric power can be easily obtained as compared with the case where another storage means is used in the vehicle.

It will be appreciated that the present invention is not limited to the configurations described above, but any and all modifications, variations or equivalents, which may occur to those who are skilled in the art, should be considered to fall within the scope of the present invention.

What is claimed is:

1. A power supply apparatus for a vehicle which supplies electric power to a power supply unit and charges electric power from the power supply unit to a battery of the vehicle via a power port, wherein
the vehicle includes a first power inverter circuit which supplies electric power to a load and receives electric power from the load, a capacitor which is connected to the first power inverter circuit, a high-resistance electric path and a low-resistance electric path which electrically connect between the capacitor and the battery and whose resistance values are different from each other, a first switching unit which opens/closes the high-resistance electric path and the low-resistance electric path, and a unit which operates the first switching, unit, when connecting between the battery and the first power inverter circuit, in such a manner that after a first state is maintained in which the high-resistance electric path is closed and the low-resistance electric path is opened, a second state is maintained in which the high-resistance electric path is opened and the low-resistance electric path is closed, comprising:
an electric power transferring electric path arranged to connect the power port to the first power inverter circuit;
an operating unit configured to operate the first power inverter circuit to supply electric power to the power supply unit and receive electric power from the power supply unit;
a prohibiting unit configured to prohibit the electric path between the power supply unit and the first power inverter circuit from closing in response to the amount of charge of the capacitor being equal to or less than a predetermined value; and
a unit configured to measure voltage across the capacitor, the prohibiting unit being configured to determine that the amount of charge is equal to or less than the predetermined value in response to the measured voltage being equal to or less than a threshold value.

2. The power supply apparatus according to claim 1, further comprising
a preprocessing unit which supplies electrical energy of the battery to the capacitor via the high-resistance electric path before the electric path between the power supply unit and the first power inverter circuit is closed.

3. The power supply apparatus according to claim 2, further comprising
a second switching unit which opens and closes the electric power transferring electric path, wherein
the prohibiting unit closes the second switching unit after the electrical energy of the battery is supplied to the capacitor by the preprocessing unit.

4. The power supply apparatus according to claim 1, wherein
the vehicle further includes a rotating machine which is mechanically coupled to drive wheels, and a second power inverter circuit which is operated to control power applied to the drive wheels by the rotating machine, and
the first power inverter circuit is interposed between the battery and an auxiliary unit which is an in-vehicle electric load other than the rotating machine.

5. The power supply apparatus according to claim 4, wherein
the battery is connected to input terminals of the second power inverter circuit.

6. The power supply apparatus according to claim 1, wherein
the prohibiting unit is configured to determine that the amount of charge is less than the predetermined value in response to the measured voltage being less than the threshold value, and
the prohibiting unit is configured to prohibit the electric path from connecting the power port to the first power inverter circuit in response to the amount of charge of the capacitor being less than the predetermined value.

* * * * *